United States Patent [19]

Fujita et al.

[11] 4,096,313

[45] Jun. 20, 1978

[54] ELECTRICAL INSULATING PAPER AND METHOD OF MAKING SAME

[75] Inventors: Hideo Fujita, Takarazuka; Hirotaka Itoh, Nishinomiya, both of Japan

[73] Assignee: Dainichi-Nippon Cables, Ltd., Hyogo, Japan

[21] Appl. No.: 793,909

[22] Filed: May 4, 1977

[51] Int. Cl.² .............................................. B32B 5/02
[52] U.S. Cl. ................................... 428/304; 428/516; 428/903; 162/138; 162/146
[58] Field of Search ............... 428/286, 298, 299, 300, 428/301, 304, 306, 326, 327, 511, 512, 513, 516, 903; 162/138, 146

[56] References Cited

U.S. PATENT DOCUMENTS

| | | | |
|---|---|---|---|
| 3,194,872 | 7/1965 | Garner | 174/25 |
| 3,532,800 | 10/1970 | Wyly et al. | 428/293 |
| 3,749,813 | 7/1973 | Shealy | 174/42 |
| 3,957,573 | 5/1976 | Miyamoto et al. | 162/138 |
| 4,041,203 | 8/1977 | Brock et al. | 428/286 |

*Primary Examiner*—William J. Van Balen
*Attorney, Agent, or Firm*—Pollock, Vande Sande & Priddy

[57] ABSTRACT

The herein-disclosed electrical insulating paper is well-suited to the insulation of extra-and ultra-high-voltage oil-filled electric power cable, and comprises at least one layer (A) which is a mixture of polypropylene fibers and kraft pulp and at least one layer (B) of accumulated polypropylene fibers laminated to the layer (A) by fiber-to-fiber bonding of the polypropylene fibers. The electrical insulating paper is prepared by superposing at least one layer of a mixed paper of polypropylene fibers and kraft pulp and at least one layer of polypropylene web, and heating the superposed layers at a temperature of 110° to 180° C to thermally laminate the layers each other.

10 Claims, 4 Drawing Figures

ELECTRICAL INSULATING PAPER AND METHOD OF MAKING SAME

BACKGROUND OF THE INVENTION

The present invention relates to electrical insulating paper used in the oil-impregnated state.

To meet the ever increasing demand for electrical power in recent years, it has been desired to develop techniques for transmitting large blocks of power through extra-and ultra-highvoltage oil-filled underground cables. The development of high-quality electrical insulating paper is one of the important keys to the establishment of such technique. Because the kraft pulp insulating paper is not suited for use in extra-high-voltage cables due to its high dielectric loss factor, research efforts have been directed throughout the world to the development of electrical insulating paper having lower loss than kraft pulp insulating paper. In fact, many proposals are so far known.

Polypropylene, with its low loss factor and high thermal stability, is one of the most hopeful polymers as a substitute for kraft pulp in making insulating paper. Electrical insulating papers consisting predominantly of polypropylene are known in U.S. Pat. nos. 3,532,800, 3,194,872, 3,749,813, 3,957,573, etc. However, the papers disclosed in these patents are not fully satisfactory in oil resistance. The paper proposed in U.S. Pat. No. 3,957,573, although having much higher oil resistance than the others, still involves the problem that the elastic modulus of the paper gradually decreases during a prolonged period of use in the oil-impregnated state. Japanese Patent Publication No. 8421/1963 dicloses mixed paper composed of kraft pulp and polypropylene fibers. The proposal has the drawback that an attempt to lower the dielectric loss factor of the paper invariably reduces its mechanical strength due to the low bonding strength between the kraft pulp and polypropylene fibers.

SUMMARY OF THE INVENTION

The present invention provides electrical insulating paper which is outstanding in electrical properties, mechanical properties, oil resistance and amenability to impregnation with oil, and is well-suited to the insulation of extra-and ultra-high-voltage oil-filled electric power apparatus, especially to power cables.

The electrical insulating paper of the invention comprises at least one layer A which is a mixture of polypropylene fibers, preferably 10 to 30µm in diameter, and kraft pulp, the layer A containing 3 to 35% by weight of the polypropylene fibers, and at least one layer B of polypropylene fibers laminated to the layer A by the fiber-to-fiber bonding of the polypropylene fibers located at the surfaces of the layers A and B, the amount of the layer B being 3 to 80% by weight based on the combined amount of the layers A and B. To impart increased mechanical strength and improved air impermeability to the insulating paper, the layer A may further contain up to 25% by weight of polyolefin microfibers less than 10µm in diameter.

The present invention further provides a process for making electrical insulating paper comprising superposing at least one layer which is a mixture of kraft pulp and polypropylene fibers or at least one layer which is a mixture of kraft pulp, polypropylene fibers and polyolefin microfibers for forming the layer A and at least one layer of polypropylene fibers for forming the layer B, the layers being in the ratio hereinabove specified, and heating the superposed layers at a temperature of 110° to 180° C to thermally laminate the layers together by the heat adhesion of the polypropylene fibers of both layers.

DETAILED DESCRIPTION OF THE INVENTION

Figure 1:
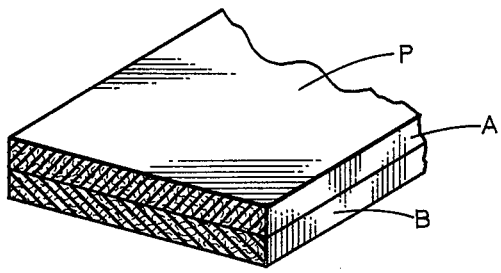
FIGS. 1 and 2 are perspective views showing embodiments of the invention.
Figure 2:
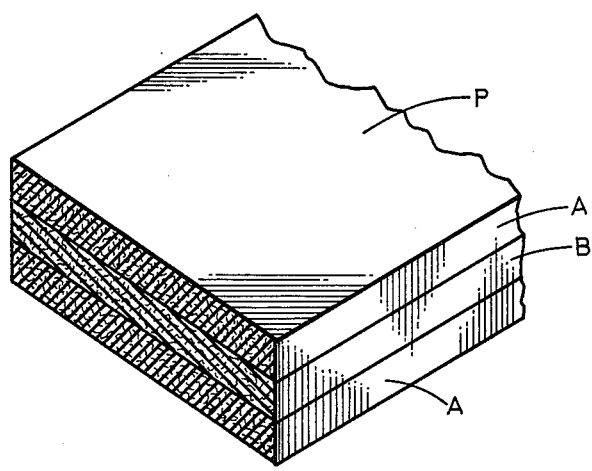

With reference to FIG. 1, electrical insulating paper P is composed of a layer A which is a mixture of kraft pulp and polypropylene fibers and a layer B of accumulated polypropylene fibers. The layers A and B are laminated to each other by the fiber-to-fiber bonding of polypropylene fibers located at the surfaces of the layers. The kraft pulp and polypropylene fibers in the layer A and polypropylene fibers in the layer B are accumulated to such compactness that the insulating paper P has an air impermeability of at least $1 \times 10^5$ Emanueli unit (hereinafter abbreviated as "EU"), and the two layers are firmly laminated together by the fiber-to-fiber bonding of the polypropylene fibers. Accordingly, the electrical insulating paper P has high mechanical properties and outstanding oil resistance. The outstanding oil resistance is attributable to the fact that the kraft pulp which is in the form of a tough network due to the hydrogen bonding serves as a support even when the polypropylene fibers in the layers A and B swell to some extent in the oil and reduce in their mechanical strength. The presence of the polypropylene fibers is very effective in lowering the dielectric loss factor. The kraft pulp at the surface of layer A prevents the formation of an uninterrupted polypropylene film in the interface between the layers A and B. In other words, numerous micropores still remain in the interface due to the presence of kraft pulp. These micropores serve as oil channels for impregnating the paper with oil, thus rendering the insulating paper of the invention highly amenable to impregnation with oil. However, if the air impermeability exceeds $2 \times 10^9$ EU, the paper becomes less amenable to impregnation with oil, so that the air impermeability should be lower than this value. Preferably, the air impermeability is $5 \times 10^5$ to $1 \times 10^9$ EU, more preferably $1 \times 10^6$ to $1 \times 10^9$ EU. When prepared with such characteristics, the electrical insulating paper obtained has well-balanced properties in respect of air impermeability, mechanical properties, dielectric characteristics, oil resistance and amenability to impregnation with oil. All the polypropylene fibers at the surface of the layer A and all the polypropylene fibers at the surface of the layer B need not be bonded each other, but the fibers of both surfaces may be bonded partially insofar as the delaminating strength between the layers A and B of the resulting paper is at least 50g/15 mm-width. The delaminating strength is measured by separating the layer A from the layer B at one end of a 15 mm wide strip of the paper and peeling off the layers from each other on a tensile tester at a rate of 10 mm/min with the separated ends of the layers gripped by chucks. Of course, the polypropylene fibers positioned near the surface of the layer A may also be bonded to the polypropylene fibers of the layer B, and vice versa. With reference to FIG. 2, electrical insulating paper P is composed of a layer B sandwitched between two layers A.

According to the invention, the layer A and the layer B are arranged alternately and laminated together into an assembly of at least two layers. When the electrical insulating paper is composed of an even number of layers such as two or four layers, the paper tends to curl toward one side due to the shrinkage of the kraft pulp in the layer A on drying. Such curl is avoidable when the paper is composed of an odd number of layers, one of the layers A and B being greater than the other by one in number. The preferred examples include a three-layer assembly in which one layer A is sandwiched between two layers B or one layer B is sandwiched between two layers A. The three-layer assembly of the latter type is the most preferable.

The kraft pulp useful as a component of the layer A may be any of those having such quality that is suitable for making the electric cable insulating paper specified in JIS C 2307. It is especially preferable to use the pulps fully washed with deionized water and those purified in an electric field in accordance with the method of U.S. Pat. No. 3,835,006.

Useful polypropylene fibers for the layers A and B are those prepared by usual melt spinning of polypropylene of the grade processable into fibers, and those prepared by splitting a film of such polypropylene. The fibers may be oriented or non-oriented. The insulating paper of the invention has outstanding oil resistance due to the presence of kraft pulp as already described. Insulating paper of greatly improved oil resistance can be obtained by the use of the fibers prepared from polypropylene having a melt index of 2–20 g/10 min, preferably 8–16 g/min, as determined according to ASTM D 1238, a density of at least 0.89, preferably at least 0.90, as measured at 20° C according to ASTM D 1505, and a decalinextractable content of up to 15% by weight, preferably up to 10% by weight, as determined by allowing 5 g of polypropylene (about 100 mesh) to stand in a sufficient amount of decalin at 77° C for 3 hours with stirring, and then measuring the amount in percent by weight of the polypropylene dissolved out into the decalin.

If the polypropylene fibers used in the layers A and B have too large a diameter, the insulating paper has reduced mechanical strength and tends to exhibit a lower air impermeability. It is therefore desired to use fibers having a diameter of up to 50μm, preferably up to 30 μm. Not infrequently, polypropylene fibers are contaminated with the lubricant or auxiliary agent used for the melt spinning process or fiber cutting step or with some other extraneous matter, with the result that the contaminant gives an increased dielectric loss to the insulating paper obtained. Accordingly, such contaminated fibers should preferably be washed, before use, with a suitable solvent at room temperature or preferably at an elevated temperature of at least 40° C. Examples of useful solvents are low-molecular-weight alcohols, ketones, ethers and deionized water.

Advantageously, the layer A is formed by the wet papermaking process as in the manufacture of usual insulating paper from kraft pulp because it contains kraft pulp. If polypropylene fibers of small diameter are used, the fibers will undergo agglutination in water, presenting difficulty in preparing a fiber slurry in which the kraft pulp and polypropylene fibers are dispersed as desired. For this reason, the polypropylene fibers to be used for the formation of the layer A may have a diameter of 10 to 30μm, preferably 12 to 25 μm, and a length of 1 to 30 mm, preferably 2 to 15 mm.

The amount of the polypropylene fibers to be contained in the layer A is at least 3% by weight based on the combined amount of the polypropylene fibers and kraft pulp, preferably at least 5% by weight to permit an increased amount of the fibers to be positioned at the surface of the layer A for the laminating to the layer B. However, the polypropylene fibers, if used in an excess amount, will afford reduced mechanical strength to the insulating paper, so that the amount should be up to 35% by weight based on the combined amount of the polypropylene fibers and kraft pulp, preferably up to 30% by weight.

The presence of a small amount of polyolefin microfibers in the layer A is advantageous in giving an increased air impermeability and improved mechanical strength. Examples of useful microfibers of polyolefins are those of polyethylene, polypropylene, poly(methyl pentene-1), etc. having a diameter of less than 10μm, preferably from 0.2 to less than 10μm, and a length of 0.1 to 5 mm. It is preferable that the microfibers of polyolefin be those containing 0.1 to 10% by weight of a polymer having hydrophilic groups, based on the combined amount thereof, or those prepared from a polyolefin containing 0.1 to 10% by weight of chemically bonded hydrophilic groups, since these fibers are highly dispersible in water.

Exemplary of the polymer having hydrophilic groups are polymers having at least 0.2 hydrophilic group per repeating unit of the polymer, such hydrophilic groups being —COOH, —COO—, —NH$_2$, —CN, —OH, —NHCONH$_2$, $-(OCH_2CH_2)_n$, halogen, and such groups that have an approximately equivalent hydrophilic property. More specific examples are polyvinyl alcohol having a remaining acetate content of up to 40% and a molecular weight of 10$^4$ to 10$^6$, polyethyleneoxide having a molecular weight of 10$^4$ to 10$^7$, etc. These polymers can be contained in the polyolefin microfibers in the form of fibers or particles.

Examplary of the polyolefin containing chemically bonded hydrophilic groups are those having at least one of the hydrophilic groups given above. Examples of such polyolefins are ethylene-vinyl acetate copolymer, ethylene-ethyl acrylate copolymer, chlorinated polyethylene, etc.

The polyolefin microfibers are preferably about 0.1 to 5 mm in length. An excess of the microfibers, if used, wil reduce the concentration of the kraft pulp, adversely affecting the oil resistance. It is therefore preferable to use the kraft pulp, the polypropylene fibers 10 to 30μm in diameter, and the polyolefin microfibers in amounts of 40 to 97% by weight, 3 to 35% by weight and up to 25% by weight respectively on the combined amount of the above three components, more preferably 50 to 95% by weight, 5 to 30% by weight and up 20% by weight respectively.

The polypropylene fibers used for forming the layer B are those having a diameter of up to 50μm. Generally, the finer the fibers, the better will be the result. Thus, the diameter is preferably up to 10μm, more preferably 0.2 to 10μ, most preferably 0.5 to 8μm. The layer B is in the form of a hardly air-permeable network resulting from the complicated entanglement of the polypropylene fibers and/or partial bonding of the fibers. To impart high air impermeability and high mechanical properties to the electrical insulating paper of the invention, it is desirable that the polypropylene fibers in the layer B be bonded together by bonding at the great number of points of mutual contact. If the proportion of the layer B based on the present paper, namely on the layers A and B combined, is less than 3% by weight, the paper has a higher dielectric loss factor especially at high temperatures, whereas if it is in excess of 80% by weight, reduced mechanical properties and lower oil resistance will result. The amount of the layer B is preferably 3 to 60% by weight, more preferably 5 to 50% by weight.

When the polypropylene fibers for forming the layer B are exceedingly short, it is difficult to obtain electrical insulating paper of high mechanical strength and high air impermeability. The length is preferably at least 5 mm, more preferably at least 10 mm. Endless polypropylene fibers are most preferable.

The electrical insulating paper of the invention can be prepared generally by superposing at least one layer of mixed paper composed of kraft pulp and polypropylene fibers or mixed paper composed of kraft pulp, polypropylene fibers, and polyolefin microfibers for forming the layer A and at least one layer of polypropylene fiber web for forming the layer B in the hereinabove specified weight ratio into an assembly of the desired number of layers, and bonding the polypropylene fibers located at the surfaces of the layers by the desired method as with the application of heat or with the use of solvent, with the application of pressure when so required, to thereby laminate the layers together. When heat adhesion is resorted to, it is suitable that the superposed layers be heated to a temperature of 110° to 180° C, preferably 130° to 170° C, by means of a conventional heat adhesion means, such as hot press, hot calender or super-calender at such pressure that will give a desired thickness, e.g. 70 to 300μm, and desired air-impermeability. The proper heating time, which is dependent on the heating temperature, can be determined by trial and error so as to obtain electrical insulating paper of the required high delaminating strength, air-impermeability and paper thickness. Generally, it is about 0.1 second to several tens of seconds. Even when the starting layers for forming the layers A and B are considerably bulky before the laminating, satisfactory results are attainable at a laminating pressure which is nearly equivalent to the gravity acting on a usual hot calender. However, improved results will be achieved at somewhat higher pressures than the above.

Figure 3:
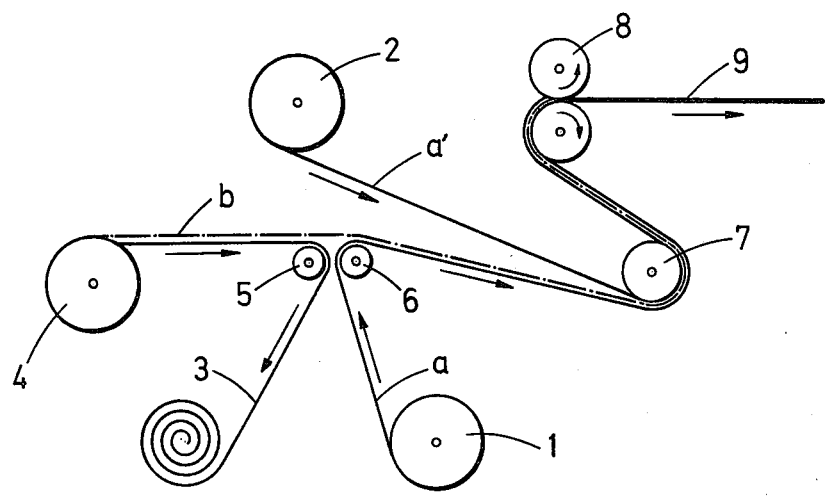
FIGS. 3 and 4 are schematic diagrams illustrating exemplary modes of practicing the process for making the electrical insulating paper of the invention.

The process for making the electrical insulating paper of the invention by heat adhesion will be described below in greater detail with reference to FIGS. 3 and 4.

Layers (a) and (a)' of mixed paper composed of kraft pulp and polypropylene fibers are prepared in the same manner as in the manufacture of usual kraft pulp insulating paper with the use of Fourdrinier paper machine or cylinder paper machine. The layers (a) and (a)' are paid out from supply rolls 1 and 2. A layer (b) of polypropylene fiber web, shown in FIG. 3, is paid out from a supply roll 4 along with a suitable supporting sheet 3 such as a polymer sheet, woven or nonwoven fabric of synthetic fibers, paper or the like. On passing over a roll 5 rotating in synchronism with the roll 4, the supporting sheet 3 is relieved from the layer (b), whereupon the layer (b) separated from the supporting sheet 3 is placed over the mixed paper layer (a) sent forward over a roll 6 disposed adjacent to the roll 5. The layers (a) and (b) are passed over a guide roll 7 and fed to a hot calender 8. The mixed paper layer (a)' paid out from the supply roll 2 is placed over the layer (b) at the guide roll 7. The three layers, i.e. the mixed paper layers (a), (a)' and the layer (b) interposed therebetween, are heated by the hot calender 8 while being pressed when passing through the hot calender 8, with the result that the three layers are laminated together into electrical insulating paper 9 due to the fiber-to-fiber heat adhesion of the polypropylene fibers at the surfaces of the layers.

The layers to be laminated together may be fed directly to the hot calender 8 without being passed over the guide roll 7. Since in such case the layers will be superposed and then simultaneously be subjected to the heat and pressure, sometimes wrinkles will occur in one of the layers, or the layers will not be brought into accurate register. When the layers to be laminated together are passed over the guide roll 7 and superposed before being fed to the hot calender 8, such trouble is avoidable. A rotatable roll, dancing roll or the like is usable as the guide roll 7.

Aside from the precautions against the abovementioned trouble, it is preferable to preheat the layers before feeding them to the hot calender 8, because the layers can then be laminated together more uniformly and firmly. The layers can be preheated by passing them over a hot roll or exposing them to infrared ray. It is suitable to preheat the layers at a temperature of at least 80° C but not higher than the temperature of the hot calender. When the guide roll 7 is employed, the preheating can be effected before and/or after the layers are passed over the guide roll. However, the guide roll 7 itself is advantageously usable also as a preheating roll.

Useful as the layer (b) are paper-like or web-like polypropylene fiber sheets prepared from polypropylene fibers by the wet or dry papermaking process, and accumulated layers of polypropylene fibers prepared by the spun-bonded process. Also usable as the layer (b) are the polypropylene papers disclosed in U.S. Pat. Nos. 3,532,800 and 3,957,573, Japanese Patent Publication No. 4760/1977, etc. When the layer (b) has sufficient tensile strength, the supporting sheet 3 need not be used, in which case the two mixed paper layers (a), (a)' and the layer (b) may be fed from the individual supply rolls to the hot calender 8 directly or by way of the guide roll 7.

Figure 4:
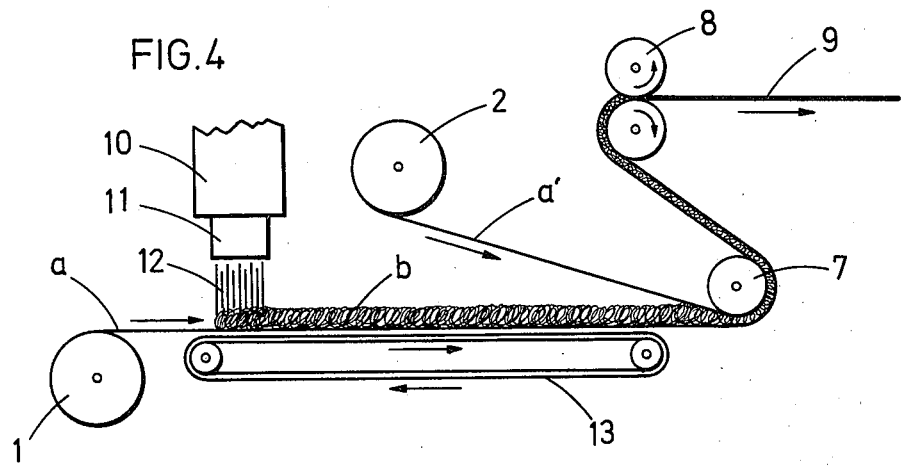

With the process shown in FIG. 4, polypropylene fibers 12 are extruded from numerous orifices of a nozzle 11 on an extruder 10 directly onto a mixed paper layer (a) to form a layer (b) in accordance with the melt blowing method as disclosed in Japanese Patent Publication No. 4760/1977. The layer (b) is conveyed on the mixed paper layer (a), which therefore serves also as a supporting sheet. Electrical insulating paper 9 of three-layer structure is obtained by the same subsequent step as shown in FIG. 3. The layer (a) paid out from a supply roll 1 is supported by means of an endless conveyor belt 13 on a path from the roll 1 to a preheating roll 7. If the polypropylene fibers 12, still having a higher temperature than the melting point of the polypropylene on extrusion from the extruder 10, are brought into contact with one another, fiber-to-fiber adhesion takes place at the points of contact. Such heat adhesion is desirable in improving the mechanical strength and air-impermeability of the insulating paper of the invention.

When the mixed paper layer (a) is prepared by the usual wet papermaking process, the layer accumulated on the paper machine tends to have increasing kraft pulp content toward the wire side, since the polypropylene fibers are lower than the kraft pulp in specific gravity. In other words, the mixed paper layer has increasing polypropylene fiber content toward the felt side. Thus, of the two sides of the mixed paper layer, the felt side has a greater polypropylene fiber portion than on the wire side, providing a greater bonding site for the polypropylene fiber layer (*b*). It is therefore desirable for the manufacture of the insulating paper of the invention to laminate the felt side of the layer (*a*) to the polypropylene layer (*b*) to ensure increased laminating strength between the two layers and to thereby obtain insulating paper which is outstanding in mechanical strength, oil resistance, air-impermeability, etc. Moreover, the insulating paper prepared has another advantage of possessing a reduced coefficient of friction since the smooth wire sides provide the both surfaces of the paper.

In the case where the mixed paper layer (*a*) and the layer (*b*) are to be laminated together with the use of a solvent, the polypropylene fibers at least at the surfaces of the layers (*a*) and (*b*) to be laminated are temporarily swollen with an organic solvent capable of swelling the fibers, and the layers are thereafter pressed together on a calender or the like. Suitable examples of organic solvents are cyclohexane, decalin, heptane, tetralin, m-, o- and p-xylenes, halogenated solvents such as methylene chloride, toluene, hexane, isooctane and mixtures thereof. Of these examples, the volatile solvents are preferred since they are readily removable after the press-laminating operation.

The electrical insulating paper of the invention has the following characteristics:

(a) With sufficient mechanical strength in the dry state, the paper is applicable to electric conductors as by tape lapping, free of any trouble.

(b) Being free from any layer which would block the penetration of oil, the paper is fully amenable to impregnation with oil, thus eliminating the reduction of dielectric strength due to the incomplete impregnation heretofore frequently experienced with electrical insulating papers incorporating a polypropylene film.

(c) The paper in the oil-impregnated state has a lower dielectric loss factor than any other oil-impregnated kraft pulp paper presently available. A proper choice of the conditions such as the kinds and amounts of kraft pulp and polypropylene fibers gives a dielectric loss factor which is as low as up to $2 \times 10^{-3}$ at 100° C.

(d) Even when used over a prolonged period of time as impregnated with a usual electrical insulating oil, the paper retains sufficient tensile strength, elongation, elastic modulus and like mechanical strength to serve as an insulator. Especially in the stability of elastic modulus, the present paper is exceedingly superior to the polypropylene fiber papers heretofore known.

(e) The paper is comparable or superior to the existing oil-impregnated kraft pulp papers with respect to the dielectric strength in the oil-impregnated state.

Because of the outstanding characteristics stated above, the electrical insulating paper of the invention is well-suited for use in electric power apparatus for services at a low voltage of about 20 kV to an extra- or ultra-high voltage of about 500 or 1000 kV.

This invention will be described below in greater detail with reference to Examples.

EXAMPLE 1

Kraft pulp (85% by weight) and 15% by weight of polypropylene fibers were dispersed in deionized water having an electrical conductivity of 4 $\mu v$/cm, and the slurry was fed to a cylinder paper machine to prepare mixed paper having a basis weight of 40 g/m² (according to ASTM D 646) and a thickness of about 100μm. The kraft pulp was prepared by cooking soft wood by the kraft process and had a beating degree of 60° SR and an ash content of 0.25% by weight (according to ASTM D 202). The polypropylene fibers, 18 μm in average diameter and 3 mm in length, were prepared from a polypropylene having a density of 0.90 g/cm³ at 20° C, a decalin-extractable content of 3% by weight and a melt index of 15 g/10 min (as measured according to ASTM D 1238 at 230° C and with the load of 2.16 kg). Before the papermaking, the fibers were washed three times with a sufficient amount of deionized water at 50° C to remove impurities from the fiber surfaces and also to break the fibers.

Separately, a web of endless fibers 2 μm in average diameter was prepared by spinning a polypropylene by the melt blowing method with the use of a die having numerous orifices. The polypropylene had a density of 0.90 g/cm³ at 20° C, a melt index of 15 g/10 min and a decalin-extractable content of 5% by weight. The web had a basis weight of 30 g/m² and a thickness of about 300 μm. The web was then sandwiched between two sheets of the above mixed paper in contact with the felt sides of the paper sheets, and the assembly was continuously fed to a hot calender at a rate of 5 m/min by way of a preheating guide roll heated at 110° C to obtain electric insulating paper of three-layer structure. The hot calender was operated at a temperature of 160° C at pressure of 5 kg/cm²-G.

EXAMPLES 2 to 11

In each of the Examples, mixed paper and a polypropylene fiber web were prepared from the same materials as used in Example 1 in the same manner as in Example 1, and electrical insulating paper of three-layer structure was prepared in the same manner as in Example 1, with the exception of the conditions listed in Table 1 below, i.e. the component ratio and the basis weight of the mixed paper, the basis weight of the polypropylene fiber web and the temperature of the hot calender. The polypropylene microfibers used in Examples 8, 10 and 11 were prepared from the same polypropylene fibers, 2 μm in average diameter, as used in Example 1 by cutting them to a length of about 1 mm. The polyethylene microfibers used in Examples 6 and 9 were prepared from 97% by weight of polyethylene having a density of 0.95 g/cm³ at 20° C and a melt index (ASTM D 1238, at 190° C, 2.16kg) and 3% by weight of polyvinyl alcohol having a remaining acetate content of 10% and an average molecular weight of 140,000 by dissolving the materials in toluene with heating within a pressure-resistant container and forcing out the solution from a nozzle on the container by the vapor pressure of the toluene. The fibers were 0.03 to 1.0 μm in diameter and 0.5 to 2 mm in length. Since the polypropylene fiber web used in Example 2 had low tensile strength, the same mixed paper as obtained in Example 1 was used as a supporting sheet to prepare electrical insulating paper by the process shown in FIG. 4.

Table 1 indicates the properties of the electrical insulating papers prepared in Examples 1 to 11. For comparison, Table 1 also shows the properties of the electrical insulating papers of Comparison Examples 1 to 5. Comparison Example 1 differed from Example 11 only in that the mixed paper used contained an excess, i.e. 50% by weight, of the polypropylene fibers. In Comparison Example 2, the same kraft pulp as used in Example 1 was used to make the 145 μm thick kraft pulp paper with the use of deionized water. In Comparison Example 3, the same kraft pulp as used in Example 1 and polypropylene fibers 18 μm in diameter were made into a sheet in the weight ratio of 1:1, and the sheet was then calendered at 160° C to prepare 151 μm thick mixed paper. In Comparison Example 4, the same polypropylene fiber web as used in Example 1 except that the basis weight was 120 g/m² was calendered at 140° C to prepare 155 μm thick polypropylene fiber paper. In Comparison Example 5, kraft pulp paper, 40 g/m² in basis weight, was prepared from the same kraft pulp as used in Example 1 with the use of deionized water. A 60 μm thick film of polypropylene, having a density of 0.90 g/cm³, a melt index of 15 g/10 min and a decalin-extractable content of 5% by weight, was sandwiched between two sheets of the kraft pulp paper, and the assembly was calendered at 160° C to prepare a kraft pulp paper/polypropylene film laminate having a thickness of 150 μm.

Table 1

| | | Example 1 | Example 2 | Example 3 | Example 4 |
|---|---|---|---|---|---|
| Mixed paper Composition (wt.%) | | | | | |
| Kraft pulp | | 85 | 85 | 85 | 95 |
| Polypropylene fibers | | 15 | 15 | 15 | 5 |
| Polyolefin microfibers | | — | — | — | — |
| Basis weight (g/m²) | | 40 | 40 | 40 | 35 |
| Polypropylene fiber web | | | | | |
| Basis weight (g/m²) | | 30 | 5 | 70 | 50 |
| Temp. of calender (° C) | | 160 | 170 | 150 | 175 |
| Properties of insulating paper | | | | | |
| Thickness (μm) | 1) | 150 | 113 | 200 | 145 |
| Air-impermeability (EU) | 2) | $1.5 \times 10^8$ | $5 \times 10^8$ | $5 \times 10^7$ | $2 \times 10^8$ |
| Tensile modulus (kg/mm²) | 3) | 250 | 300 | 210 | 310 |
| Oil resistance | 4) | | | | |
| Increase in thickness (%) | | 2 | 1 | 2 | 0 |
| Tensile modulus (kg/mm²) | | 240 | 280 | 200 | 300 |
| Delaminating strength (g/15 mm width) | | 130 | 150 | 120 | 80 |
| Oil flow resistance (sec²/cm³) | 5) | $5 \times 10^8$ | $6 \times 10^8$ | $3 \times 10^8$ | $4 \times 10^8$ |
| Dielectric properties (at 100° C) | 6) | | | | |
| Dielectric constant | | 2.7 | 3.0 | 2.4 | 2.6 |
| Dissipation factor(%) | | 0.085 | 0.100 | 0.065 | 0.080 |
| Dielectric loss factor | | $2.3 \times 10^{-3}$ | $3.0 \times 10^{-3}$ | $2.1 \times 10^{-3}$ | |

| | | Example 5 | Example 6 | Example 7 | Example 8 |
|---|---|---|---|---|---|
| Mixed paper Composition (wt.%) | | | | | |
| Kraft pulp | | 70 | 65 | 90 | 90 |
| Polypropylene fibers | | 30 | 25 | 10 | 6 |
| Polyolefin microfibers | | — | 10(PE) | — | 4(PP) |
| Basis weight (g/m²) | | 40 | 45 | 32 | 20 |
| Polypropylene fiber web | | | | | |
| Basis weight (g/m²) | | 30 | 20 | 27 | 40 |
| Temp. of calender (° C) | | 150 | 140 | 170 | 170 |
| Properties of insulating paper | | | | | |
| Thickness (μm) | 1) | 153 | 155 | 100 | 100 |
| Air-impermeability (EU) | 2) | $2 \times 10^8$ | $7 \times 10^7$ | $1 \times 10^7$ | $6 \times 10^7$ |
| Tensile modulus (kg/mm²) | 3) | 230 | 240 | 270 | 230 |
| Oil resistance | 4) | | | | |
| Increase in thickness (%) | | 3 | 3 | 0 | 1 |
| Tensile modulus (kg/mm²) | | 210 | 210 | 270 | 220 |
| Delaminating strength (g/15 mm width) | | 180 | 170 | 100 | 110 |
| Oil flow resistance (sec²/cm³) | 5) | $5 \times 10^8$ | $7 \times 10^8$ | $2 \times 10^8$ | $3 \times 10^8$ |
| Dielectric properties (at 100° C) | 6) | | | | |
| Dielectric constant | | 2.5 | 2.5 | 3.1 | 3.1 |
| Dissipation factor (%) | | 0.050 | 0.090 | 0.11 | 0.080 |
| Dielectric loss factor | | $1.2 \times 10^{-3}$ | $2.2 \times 10^{-3}$ | $3.4 \times 10^{-3}$ | $2.5 \times 10^{-3}$ |

| | Example 9 | Example 10 | Example 11 | Comparison Example 1 |
|---|---|---|---|---|
| Mixed paper Composition (wt.%) | | | | |
| Kraft pulp | 70 | 60 | 55 | 30 |
| Polypropylene fibers | 18 | 33 | 25 | 50 |
| Polyolefin microfibers | 12(PE) | 7(PP) | 20(PP) | 20(PP) |
| Basis weight ( g/m²) | 32 | 20 | 32 | 32 |
| Polypropylene fiber web | | | | |
| Basis weight (g/m²) | 27 | 40 | 27 | 27 |
| Temp. of calender (° C) | 165 | 160 | 155 | 155 |

Table 1-continued

| Properties of insulating paper | | | | | |
|---|---|---|---|---|---|
| Thickness (μm) | 1) | 100 | 100 | 100 | 100 |
| Air-impermeability (EU) | 2) | $4.5 \times 10^7$ | $1.5 \times 10^7$ | $2.5 \times 10^7$ | $1 \times 10^5$ |
| Tensile modulus (kg/mm$^2$) | 3) | 250 | 180 | 230 | 50 |
| Oil resistance | 4) | | | | |
| Increase in thickness (%) | | 1 | 2 | 1 | 1 |
| Tensile modulus (kg/mm$^2$) | | 230 | 160 | 200 | 40 |
| Delaminating strength (g/15 mm width) | | 150 | 160 | 160 | 150 |
| Oil flow resistance (sec$^2$/cm$^3$) | 5) | $5 \times 10^8$ | $4 \times 10^8$ | $6 \times 10^8$ | $2 \times 10^8$ |
| Dielectric properties (at 100° C) | 6) | | | | |
| Dielectric constant | | 2.7 | 2.6 | 2.5 | 2.3 |
| Dissipation factor (%) | | 0.08 | 0.06 | 0.09 | 0.05 |
| Dielectric loss actor | | $2.2 \times 10^{-3}$ | $1.6 \times 10^{-3}$ | $2.3 \times 10^{-3}$ | $1.2 \times 10^{-3}$ |

| | | Comparison Example 2 | Comparison Example 3 | Comparison Example 4 | Comparison Example 5 |
|---|---|---|---|---|---|
| Mixed paper composition (wt.%) | | | | | |
| Kraft pulp | | — | — | — | — |
| Polypropylene fibers | | — | — | — | — |
| Polyolefin microfibers | | — | — | — | — |
| Basis weight (g/m$^2$) | | — | — | — | — |
| Polypropylene fiber web Basis weight (g/m$^2$) | | — | — | — | — |
| Temp. of calender (° C) | | — | — | — | — |
| Properties of insulating paper | | | | | |
| Thickness (μm) | 1) | 145 | 151 | 155 | 150 |
| Air-impermeability (EU) | 2) | $6 \times 10^6$ | $2 \times 10^5$ | $5 \times 10^7$ | ∞ |
| Tensile modulus (kg/mm$^2$) | 3) | 450 | 50 | 130 | 460 |
| Oil resistance | 4) | | | | |
| Increase in thickness (%) | | 0 | 5 | 2 | 10 |
| Tensile modulus (kg/mm$^2$) | | 450 | 30 | 50 | 430 |
| Delaminating strength (g/15mm width) | | — | — | — | 30 |
| Oil flow resistance (sec$^2$/cm$^3$) | 5) | $1.5 \times 10^8$ | $1 \times 10^8$ | $4 \times 10^8$ | $5 \times 10^9$ |
| Dielectric properties (at 100° C) | 6) | | | | |
| Dielectric constant | | 3.3 | 2.6 | 2.3 | 2.9 |
| Dissipation factor (%) | | 0.196 | 0.075 | 0.020 | 0.073 |
| Dielectric loss actor | | $6.5 \times 10^{-3}$ | $2.0 \times 10^{-3}$ | $0.5 \times 10^{-3}$ | $2.2 \times 10^{-3}$ |

The properties listed in Table 1 were determined by the following methods.
1) Thickness : According to ASTM D 374, Method A.
2) Air impermeability : Measured by Emanueli's porosimeter.
3) Tensile modulus : A 15 mm wide strip of the specimen was pulled on a tensile tester at a rate of 10 mm/min to obtain an automatically recorded stress-strain curve. The tensile modulus was determined from the radient of the initial upstanding portion of the curve.
4) Oil resistance : Strips of the specimen, 15 mm in width, were immersed dodecylbenzene (DDB), having a kinetic viscosity of 7.6 cst at 100° F, at 100° C for 10 days and were thereafter tested for the following properties : (1) the increase of the thickness as measured by the method 1) above, (2) the tensile modulus by the method 3) above, and (3) the delaminating strength between the constitutent layers of the strip.
5) Oil flow resistance : A model cable was prepared by such a manner that twelve strips of the specimen, 20 mm in width, were lapped around a pipe at a butt gap distance of 1 mm and registration of ½, the pipe being closed at one end and having a diameter of 16 mm and a great number of microholes. The lapped strips were then impregnated with DDB in vacuo, then allowed to stand at 100° C for 4 days and thereafter cooled to room temperature. The other end of the pipe was connected to a pressure tank containing DDB, and the rate Q of outflow of the oil from the model cable was measured. The oil resistance B is given by :

The properties listed in Table 1 were determined by the following methods.

(1) Thickness: According to ASTM D 374, Method A.

(2) Air impermeability: Measured by Emanueli's porosimeter.

(3) Tensile modulus: A 15 mm wide strip of the specimen was pulled on a tensile tester at a rate of 10 mm/min to obtain an automatically recorded stress-strain curve. The tensile modulus was determined from the gradient of the initial upstanding portion of the curve.

(4) Oil resistance: Strips of the specimen, 15 mm in width, were immersed dodecylbenzene (DDB), having a kinetic viscosity of 7.6 cst at 100° F, at 100° C for 10 days and were thereafter tested for the following properties: (1) the increase of the thickness as measured by the method 1) above, (2) the tensile modulus by the method 3) above, and (3) the delaminating strength between the constituent layers of the strip.

(5) Oil flow resistance: A model cable was prepared by such a manner that 12 strips of the specimen, 20 mm in width, were lapped around a pipe at a butt gap distance of 1 mm and registration of ½, the pipe being closed at one end and having a diameter of 16 mm and a great number of microholes. The lapped strips were then impregnated with DDB in vacuo, then allowed to stand at 100° C for 4 days and thereafter cooled to room temperature. The other end of the pipe was connected to a pressure tank containing DDB, and the rate Q of outflow of the oil from the model cable was measured. The oil resistance B is given by:

$$B = \frac{2\pi l P}{Q \eta \ln(\frac{R}{r_c})}$$

where:
P = pressure difference,
l = effective length of model cable,
η = absolute viscosity,
R = outside diameter of insulation, and
$r_c$ = outside diameter of pipe.

(6) Dielectric constant and dissipation factor: The specimen impregnated with the above-mentioned DDB was tested at 100° C according to ASTM D 150. The dielectric loss factor was calculated by multiplying the dielectric constant by the absolute value of the dissipation factor.

Table 1 reveals that the paper of Comparison Example 2 has poor dielectric properties, while those of Comparison Examples 1, 3 and 4 are extremely low in tensile modulus in the dry and oil-impregnated states. The paper of Comparison Example 5 is defective in oil resistance as evidenced by the marked increase of thickness and also in oil flow resistance. In contrast, the papers of Examples 1 to 11 are well-balanced in all of these properties and are therefore well-suited for use as electrical insulating papers.

The results of Examples 1 to 11 listed also indicate that appropriate thicknesses and dielectric constants can be obtained by adjusting the proportions of the materials used for the layer A and the basis weights of the layers A and B. The feature that the thickness and dielectric constant are variable as desired is favorable to the design of electric power apparatus, especially of power cables in permitting capacitance grading.

What we claim is:

1. Electrical insulating paper comprising at least one layer (A) which is a mixture of polypropylene fibers and kraft pulp and contains 3 to 35% by weight of the polypropylene fibers based on the combined amount of polypropylene fibers and kraft pulp, and at least one layer (B) of polypropylene fibers laminated to the layer (A) by fiber-to-fiber bonding of the polypropylene fibers, the amount of the layer (B) being 3 to 80% by weight based on the combined amount of the layers (A) and (B).

2. Electrical insulating paper as defined in claim 1 which has an air impermeability of $1 \times 10^5$ to $2 \times 10^9$ Emanueli unit and delaminating strength of at least 50 g/15 mm-width between the layer (A) and the layer (B).

3. Electrical insulating paper as defined in claim 2 wherein the polypropylene fibers used in the layer (A) are 10 to 30 μm in diameter.

4. Electrical insulating paper as defined in claim 3 wherein the layer (A) contains 40 to 97% by weight of kraft pulp, 3 to 35% by weight of polypropylene fibers 10 to 30 μm in diameter, and up to 25% by weight of polyolefin microfibers less than 10 μm in diameter, based on the combined amount thereof.

5. Electrical insulating paper as defined in claim 3 wherein the layer (A) has a polypropylene fiber content of 5 to 30% by weight.

6. Electrical insulating paper as defined in claim 3 wherein the polypropylene fibers of the layer (B) are 0.2 to 10 μm in diameter.

7. Electrical insulating paper as defined in claim 3 wherein the amount of the layer (B) is 3 to 60% by weight based on the combined amount of the layers (A) and (B).

8. Electrical insulating paper as defined in claim 4 wherein the layer (A) contains 50 to 95% by weight of kraft pulp, 5 to 30% by weight of polypropylene fibers 10 to 30 μm in diameter, and up to 20% by weight of polyolefin microfibers less than 10 μm in diameter, based on the combined amount thereof.

9. Electrical insulating paper as defined in claim 1 which has a three-layer structure wherein either one of the layers (A) and (B) is sandwiched between the other two layers.

10. Electrical insulating paper as defined in claim 9 which has a three-layer structure wherein the layer (B) is sandwiched between two layers (A).

* * * * *